(12) United States Patent
Baker et al.

(10) Patent No.: US 8,669,963 B2
(45) Date of Patent: Mar. 11, 2014

(54) SENSOR SYSTEM

(75) Inventors: Jeffrey R. Baker, Thousand Oaks, CA (US); Volodymyr Vlaskin, Oxnard, CA (US); Carlos Solis Sanchez, Oxnard, CA (US); Matthew Fumio Yamamoto, Camarillo, CA (US); Declan Christopher Flannery, Venice, CA (US)

(73) Assignee: Interlink Electronics, Inc., Camarillo, CA (US)

(*) Notice: Subject to any disclaimer, the term of this patent is extended or adjusted under 35 U.S.C. 154(b) by 407 days.

(21) Appl. No.: 13/020,797

(22) Filed: Feb. 3, 2011

(65) Prior Publication Data

US 2011/0187674 A1    Aug. 4, 2011

Related U.S. Application Data

(60) Provisional application No. 61/300,988, filed on Feb. 3, 2010.

(51) Int. Cl.
*G06F 3/041* (2006.01)

(52) U.S. Cl.
USPC ........................................ 345/174; 178/18.01

(58) Field of Classification Search
USPC ........ 345/158, 173, 174; 178/18.01; 382/124; 73/862
See application file for complete search history.

(56) References Cited

U.S. PATENT DOCUMENTS

| | | | |
|---|---|---|---|
| 7,196,694 B2 * | 3/2007 | Roberts | 345/173 |
| 7,254,775 B2 * | 8/2007 | Geaghan et al. | 715/701 |
| 7,944,432 B2 * | 5/2011 | Taniguchi et al. | 345/156 |
| 8,310,458 B2 * | 11/2012 | Faubert et al. | 345/173 |
| 8,405,618 B2 * | 3/2013 | Colgate et al. | 345/173 |

* cited by examiner

*Primary Examiner* — Abbas Abdulselam
(74) *Attorney, Agent, or Firm* — Troutman Sanders LLP

(57) ABSTRACT

A sensor system includes a touch screen and a force sensor. The touch screen has a first and second surface and detects a first surface touch and converts it to data indicative of an X, Y coordinate position upon the touch screen first surface. The force sensor contacts the touch screen second surface and substantially extends around the perimeter of the touch screen second surface. The force sensor measures the force exerted by the first surface touch in the form of force data.

19 Claims, 3 Drawing Sheets

SENSOR SYSTEM

CROSS-REFERENCE TO RELATED APPLICATIONS

This application claims the benefit of U.S. provisional Application No. 61/300,988 filed Feb. 3, 2010. The disclosure of which is incorporated in its entirety by reference herein.

BACKGROUND

1. Technical Field

One or more embodiments of the present application relate to a sensor system.

2. Background Art

Over the last several years manufactures of portable devices, such as tablet PCs, hand-held games, PDAs and cellular phones, have incorporated touch sensitive surfaces, or touchscreens, as the primary interface between the portable device and the user. The inclusion of touch screen devices continues to increase primarily as a result of the amount of software applications being developed and made available to purchasers of these portable devices.

For example, Apple and Google have profited from increasing sales of their portable devices as a direct result of the increasing number of software applications available on each company's application software stores, or "app stores." Non-limiting examples of software applications currently available on each company's app store include interactive maps, music, pictures, videos, games or business tools. Once acquired and downloaded to a portable device, the purchaser may run and interact with the software application using the portable device's touch screen.

The increasing number of software app's available to a purchaser is directly correlated with the touch screens ability to have "soft" controls located anywhere upon the touch screen. Being able to change the functionality, placement and display of these "soft" controls allows for an almost infinite number of software applications to be developed and run on the portable device. For example, one software app may design "soft" controls that display a visual keyboard that the operator uses to enter information into the portable device. Alternatively, another software app may design "soft" controls that allow an operator the capability of navigating the Internet.

Touch screens also allow for the design of software apps that allow interacting with the portable device using finger gestures such as a "swipe" or "pinch." Such gestures allow the software app to be designed with intuitive and easy controls that may not have been possible with physical controls alone. For example, the software application may be designed to allow the operator the capability of "enlarging" or "shrinking" a picture displayed on the touch screen using simple finger swipes.

Although current touch screen technology provides X, Y coordinate location data, this technology is not able to adequately determine the amount of force (e.g., pressure) that is exerted on the touch screen by an operator without complicated mechanical systems.

SUMMARY OF THE INVENTION

According to one embodiment, a sensor system including a touch screen and a force sensor is disclosed. The touch screen has a first and second surface and detects a first surface touch and converts it to data indicative of an X, Y coordinate position upon the touch screen first surface. The force sensor contacts the touch screen second surface and substantially extends around the perimeter of the touch screen second surface. The force sensor measures the force exerted by the first surface touch in the form of force data. The sensor system may further include a housing having a top surface, an opposing bottom surface and an inner cavity. The force sensor may contact the housing top surface and the touch screen second surface to form an inner cavity seal. The force sensor may be formed of a compressible elastomeric material. The sensor system may further include a controller for receiving force data from the force sensor. The housing may include a recessed lip forming the top surface. The force sensor may be formed of an adhesive material adhesively bonding the force sensor to the housing surface and the touch screen second surface. The force sensor may extend around the entire perimeter of the touch screen second surface. The force sensor may be formed of one of the following materials: a piezoresistive material, a piezoelectric material, or an electro-mechanical capacitive material, force sensing material. The force sensor may be at least partially fabricated from one or more of these materials using a screen printing flexible or rigid fabrication method. The sensor system may further include one or more portable device components situation in the inner cavity of the housing.

According to another embodiment, a force sensor is disclosed. The force sensor includes a compressible perimeter portion measuring the force exerted thereupon in the form of force data. The force sensor further includes an electrical connector for transmitting the force data. The compressible perimeter portion may be formed from a compressible elastomeric material. The compressible perimeter portion may form a closed perimeter or a discontinuous perimeter.

According to another embodiment of the present invention, a portable device is disclosed. The portable device includes a housing, a touch screen and a force sensor. The housing includes a top surface, an opposing bottom surface and an inner cavity. The touch screen has a first and second surface and detects a first surface touch and converts it to data indicative of an X, Y coordinate position upon the touch screen first surface. The force sensor contacts the touch screen second surface and substantially extends around the perimeter of the touch screen second surface. The force sensor measures the force exerted by the first surface touch in the form of force data. The force sensor contacts the top housing surface and the touch screen second surface. The portable device may further include a seal formed between the touch sensor, the force sensor and the housing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. With reference to the Figures, a more detailed description of one or more embodiments of the present application will now be provided.

Touch screens are designed to include many different types of sensor technologies. One type of touch screen currently used for portable devices includes a resistive or conductive material which relies on an operator's touch to induce electrical contact between two separated conductive grids or surfaces. The electrical contact completes a circuit, altering a uniform flow of current across the grids. The touch screen detects the change in current flow, and transmits the sensed X, Y coordinate data to a controller. The controller uses the data to determine the location of the contact on the surface of the touch screen. Once the X, Y coordinate location is determined, the controller then determines what action should be taken.

A second type of touch screen used for portable devices includes a capacitive touch screen device, in which a matrix of X,Y lines are arrayed across the touch screen. When touched, the capacitance between the lines is altered, and this change is detected by a controller. The touch screen then transmits these changes to a controller that uses the various sensor readings to determine the X, Y coordinate location of the contact. Again, the controller uses the X, Y coordinate data to determine what action should be taken.

Figure 1:
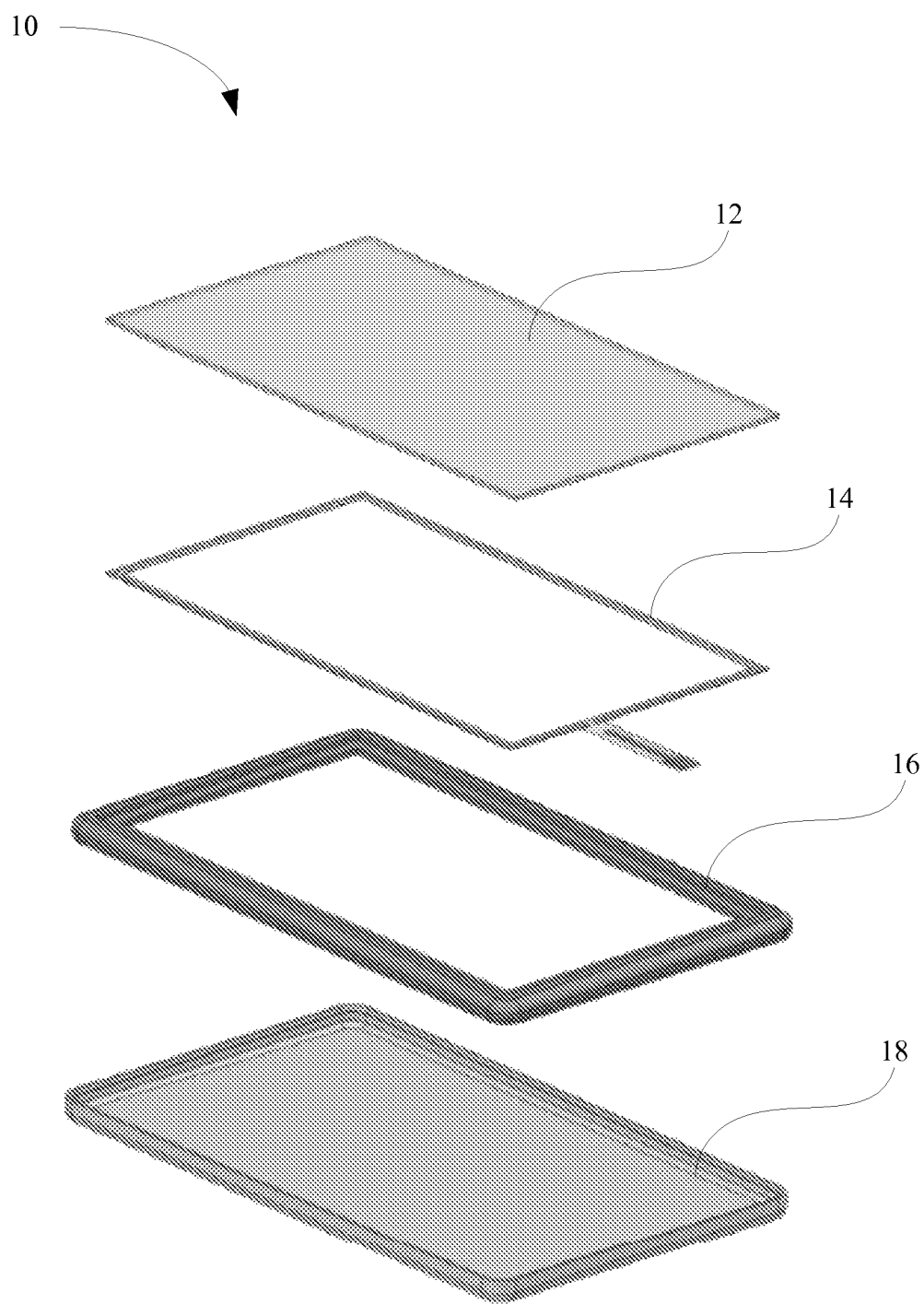
FIG. 1 is an exploded view of a portable device according to one embodiment of the present disclosure.

FIG. 1 illustrates an exploded view of a portable device 10 that may be a tablet PC, a hand-held game, a portable data assistant (PDA) or a cellular phone. The portable device 10 may include an upper and bottom members 16 and 18. The upper and bottom members 16 and 18 may be designed to hold a controller (not shown) memory modules (not shown), circuit boards (not shown) and one or more batteries (not shown).

The memory modules may include RAM or ROM modules that may be used to store one or more software applications. The portable device 10 may be designed so that the controller interacts with the memory modules to run one or more stored software applications.

The portable device 10 may further include a touch screen 12 that may be used to display the one or more software applications. The controller may be further designed so that an operator may use the touch screen 12 to interface with the one or more software applications. More specifically, the touch screen 12 may be designed with sensors that sense X, Y coordinate data. The touch screen 12 may then transmit this X, Y coordinate data to the controller and the controller may use the X, Y coordinate data to determine an operation of the software application.

For example, FIG. 1 illustrates one or more "soft" control buttons 14 through 24 that may be displayed on the touch screen 12. If an operator presses button 16, the touch screen 12 may sense the operator contact and transmit the X, Y coordinate data to the controller. In turn, the controller may use the received X, Y coordinate data to determine that button 16 has been pressed, and the controller may activate an Internet software application.

The touch screen 12 may be limited to sensing X, Y coordinate data alone. Such coordinate data, however, may not allow the controller the ability to determine if an operator's "touch" was inadvertent or intended. Sensing the amount of force that a user exerts onto a touch screen may be used by the controller to determine if an operator inadvertently contacted the touch screen. If the operator inadvertently "touches" button 16 while sliding a finger across the touch screen 12 the controller would activate the Internet software application.

Such activation could be undesirable or detrimental to operation of the portable device 10. Additional sensor data that detects the amount of pressure an operator exerts upon the touch screen 12 may assist the controller in more accurately determining an operator's intent.

Another benefit of the sensor system of one or more embodiments is a more natural feeling for portable devices having haptic feedback. The force sensor 14 may provide superior information for gauging when to initiate haptic feedback. Non-limiting devices that have haptic feedback includes devices including vibration motors or piezoelectric crystals.

The portable device 10, may therefore, include a force sensor 14 used to determine force data indicative of an amount of force compressed upon the touch screen 12. The force data may be transmitted from the force sensor 14 to the controller and may be used by the controller in addition to the X, Y coordinate data received from the touch screen 12. The controller may use the force data received from the force sensor 14 to distinguish between inadvertent "touches" and actual depressions of the touch screen 12. The controller may further use the force data and the X, Y coordinate data to more accurately control operation of the software application. In one embodiment, the controller determines if the received touch data indicates that the touch screen has been contacted, determined if the received force data indicates that the force of the contact has exceeded a predetermined threshold, and executes a software application if contact has been made with the touch screen and the contact exceeds the predetermined threshold.

The force sensor 14 may be made of a resistive material, such as a resistive elastomer. When an operator compresses the touch screen 12, the force sensor 14 may determine that the resistance value of the elastomer has changed and the force sensor 14 may transmit this force data to the controller. The controller may use this force data along with the X, Y coordinate data to control operation of the software application.

Alternatively, the force sensor 14 may be made of an electro-mechanical capacitive material, such as an elastomer filled parallel-plate capacitor material. When the touch screen 12 is compressed, the force sensor 14 may determine that the capacitance value of the electro-mechanical capacitive material has changed and the force sensor 14 may transmit this force data to the controller. The controller may again use this force data along with the X, Y coordinate data to control operation of the software application.

The force sensor 14 may also be made of a piezoelectric material, such as a piezoelectric film, for example, from Measurement Specialties, Inc., or a piezoelectret film, for example, from EMFI S.A. of Finland. When the touch screen 12 is compressed, the force sensor 14 may detect the voltage change of the piezoelectric material and the force sensor 14 may transmit this force data to the controller. The controller may use this force data along with the X, Y coordinate data to control operation of the software application.

The force sensor 14 may also be made of a force sensing material as disclosed in U.S. Pat. Nos. 5,296,837 and 5,302,936, which are herein incorporated by reference in their entirety. Non-limiting examples include a stannous oxide force transducer or a conductive particulate force transducer.

The force sensor 14 may also be made using a screen printing process known to those skilled in the art. For example, the force sensor 14 may be "printed" or applied to a flexible or rigid substrate. The force sensor 14 may sense a pressure change and transmit this force data to the controller.

Again, the controller may use this force data along with the X, Y coordinate data to control operation of the software application.

The force sensor 14 may be a one-piece "gasket" design that extends substantially around the outer edge of the touch screen 12. In certain embodiments, the force sensor is fabricated of an opaque material. In these cases, if the force sensor 14 is placed along the outer edge of the touch screen 12, the force sensor 14 does not cover up or obscure the touch screen 12.

Alternatively, the force sensor 14 may be made of a transparent material that extends along an entire surface area of the touch screen 12. The transparent material may allow the force sensor 14 the capability of determining an X, Y coordinate force data while preventing obstruction of the image displayed on the touch screen 12. The force sensor may transmit this data to the controller and the controller may use this X, Y coordinate force data to more accurately operate software applications running on the portable device 10.

Figure 2:
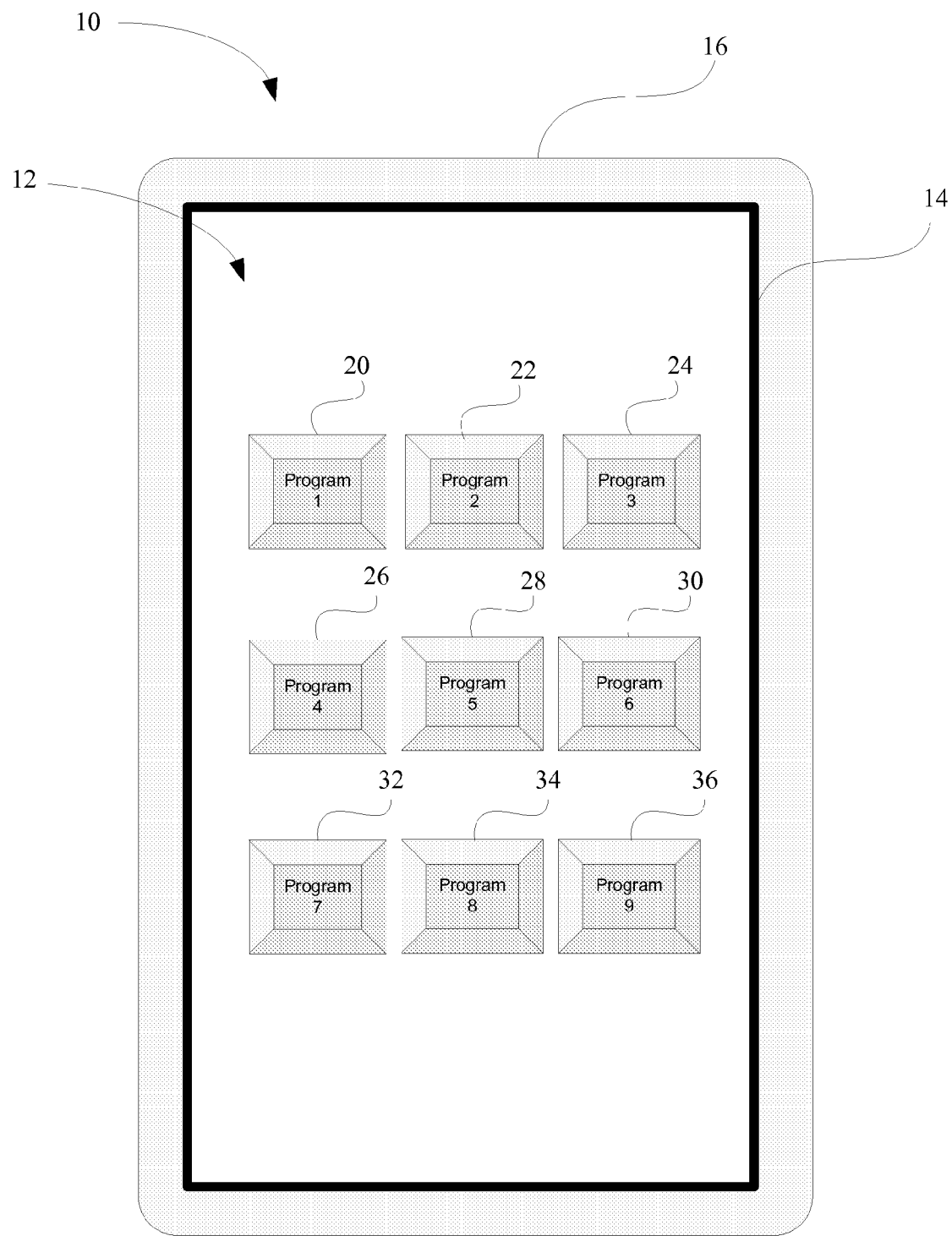
FIG. 2 is a top view of the portable device according to one embodiment.

FIG. 2 illustrates a portable device 10 displaying a plurality of control buttons 20 through 36 on the touch screen 12. The force sensor 14 may still be located along the edge of the touch screen 12, but may also extend across the entire area of the touch screen 12. Accordingly, the force sensor 14 may extend substantially about the control buttons 20 through 36. If an operator contacts the area near button 22, the force sensor 14 would sense the corresponding pressure change. The force sensor 14 would then transmit this X, Y coordinate force data to the controller and the controller may use the data to determine that the operator had contacted button 52. The controller may further use the data to determine if the contact had exerted a substantial enough force as to be an intentional contact with button 22 or if the contact had been inadvertent. If the controller determines that the force had been an intentional contact, the controller may activate Program 2.

Figure 3:
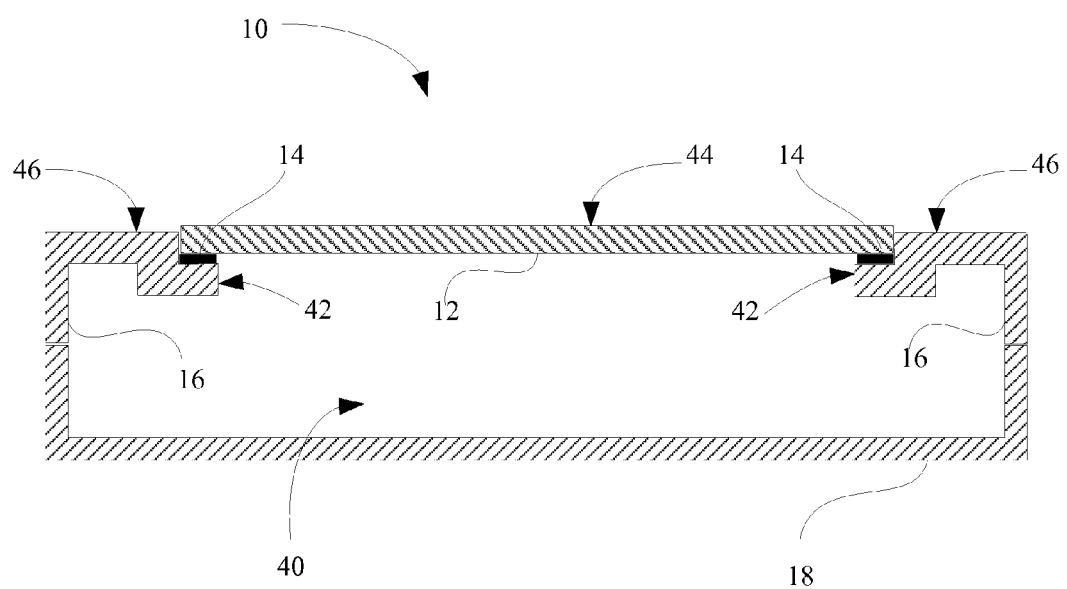
FIG. 3 is a cross sectional view of a portable device according to one embodiment.

With reference to FIG. 3, a cross sectional view of the portable device 10 is illustrated. As shown, the portable device 10 may be designed so that the upper case member 16 and the bottom case member 18 may be coupled together to form a complete case assembly. However, the portable device may use a one-piece assembly that includes a single case member (not shown). FIG. 3 also illustrates an inner area 40 that may be formed between the upper and bottom case members 16, 18. This inner area 40 may be used for placement of the portable devices 10 electronics. For example, the inner area 40 may be used for placement of the portable device's 10 memory, controller, circuit board and/or batteries.

The upper case member 16 may also include an inner lip 42 that is recessed inward toward the inner area 40. As is further illustrated, the force sensor 14 may be designed so as to rest substantially upon the inner lip 42. The force sensor 14 may also be designed to include an adhesive material that may act as a bonding agent coupling the touch screen 12 to the upper case member 16. Non-limiting examples of adhesive material include pressure sensitive films, for example, 3M part no. 798 or 7962 or Tesa part no. 4972. Once the force sensor 14 couples the upper case member 16 to the touch screen 12, the upper surface 44 of the touch screen 12 becomes flush with an exterior surface 46 of the upper case member 16. By bonding the touch screen 12 to the upper case member 16, the force sensor 14 may also operate as a dust barrier preventing any contaminants from entering into the inner area 40 of the portable device 10.

The force sensor 14 may be a one-piece assembly that operates as a gasket between the touch screen 12 and the upper case member 16. The one-piece gasket design may allow a force to be exerted on the touch screen 12 by the operator to be registered on a particular section of the force sensor 14. For example, if button 16 was pressed by the operator the touch screen would transmit the X, Y coordinate data to the controller and the force sensor 14 would transmit force data indicative of the upper left hand corner being pressed. The controller may use the received data to determine that the operator intended to launch the Internet software application. The controller may then launch the software application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sensor system comprising:
   a touch screen having a first and second surface, the first surface comprising a conductive material configured to detect an indication of a position associated with a touch on the touch screen first surface;
   a first controller configured to receive the indication of the position associated with the touch and further configured to convert the indication to data indicative of an X, Y coordinate position on the touch screen first surface; and
   a force sensor in communication with the touch screen second surface and substantially extending around-a perimeter of the touch screen second surface, the force sensor configured to measure a force exerted by the touch on the touch screen first surface, wherein the force sensor is a gasket.

2. The sensor system of claim 1, further comprising a housing having a top surface, an opposing bottom surface, and an inner cavity, wherein the force sensor is configured to contact the housing top surface and the touch screen second surface to form an inner cavity seal.

3. The sensor system of claim 2, wherein the housing top surface includes a recessed lip, wherein the recessed lip is configured to accept the force sensor.

4. The sensor system of claim 2, wherein the force sensor comprises an adhesive material configured for bonding the force sensor the touch screen second surface and at least a portion of the housing.

5. The sensor system of claim 1, wherein the force sensor comprises a compressible elastomeric material.

6. The sensor system of claim 1, further comprising a second controller configured for receiving force data from the force sensor.

7. The sensor system of claim 6, wherein the second controller and the first controller are the same controller.

8. The sensor system of claim 1, wherein the force sensor extends around the entire perimeter of the touch screen second surface.

9. The sensor system of claim 1, wherein the force sensor comprises a piezoresistive material.

10. The sensor system of claim 1, wherein the force sensor comprises a piezoelectric material.

11. The sensor system of claim 1, wherein the force sensor is comprises an electro-mechanical capacitive force sensor.

12. The sensor system of claim 1, wherein the force sensor comprises a screen printable substrate.

13. The sensor system of claim 1, wherein the force sensor comprises a particulate force transducer.

14. A force sensor system comprising:
- a touch screen having a first and second surface, the first surface comprising a conductive material configured to detect an indication of a position associated with a touch on the touch screen first surface;
- a compressible gasket force sensor in communication with the touch screen second surface, the gasket force sensor substantially extending around a perimeter of the touch screen second surface, the gasket force sensor configured to measure a force exerted by the touch on the touch screen first surface; and
- an electrical connector for transmitting output from the gasket force sensor.

15. The force sensor system of claim 14, wherein the compressible gasket force sensor comprises an elastomeric material.

16. The force sensor system of claim 14, wherein the compressible gasket force sensor forms a closed perimeter.

17. The force sensor system of claim 14, wherein the compressible gasket force sensor forms a discontinuous perimeter.

18. A portable device comprising:
- a housing having a top surface, an opposing bottom surface, and an inner cavity;
- a touch screen having a first and second surface, the first surface comprising a conductive material configured to detect an indication of a position associated with a touch on the touch screen first surface;
- a first controller configured to receive the indication of the position associated with the touch and further configured to convert the indication to data indicative of an X, Y coordinate position on the touch screen first surface; and
- a force sensor in communication with the touch screen second surface and substantially extending around a perimeter of the touch screen second surface, the force sensor configured to provide an output corresponding to a force exerted by the touch on the touch screen first surface, wherein the force sensor is configured to contact the housing top surface and the touch screen second surface, wherein the force sensor is a gasket.

19. The portable device of claim 18, further comprising a seal in communication with the touch sensor, the force sensor and the housing.

* * * * *